United States Patent [19]

Takeda

[11] Patent Number: 4,857,821

[45] Date of Patent: Aug. 15, 1989

[54] REACTIVE POWER COMPENSATION SYSTEM

[75] Inventor: Masatoshi Takeda, Hyogo, Japan

[73] Assignee: Mitsubishi Denki Kabushiki Kaisha, Tokyo, Japan

[21] Appl. No.: 173,459

[22] Filed: Mar. 25, 1988

[30] Foreign Application Priority Data

Mar. 27, 1987 [JP] Japan .................................. 62-71734

[51] Int. Cl.$^4$ .............................................. G05F 1/70
[52] U.S. Cl. .................................... 323/210; 373/104
[58] Field of Search ............... 323/207, 208, 209, 210, 323/211; 373/102, 104; 361/111, 113

[56] References Cited

U.S. PATENT DOCUMENTS 3,936,727  2/1976  Kelley, Jr. et al. .................. 323/210
4,752,726  6/1988  Aoyama .............................. 323/207

FOREIGN PATENT DOCUMENTS 2386188  10/1978  France .
59-127126  7/1984  Japan .
60-168224  8/1985  Japan .
61-125628  6/1986  Japan .

OTHER PUBLICATIONS

Hirofumi Akagi et al., "Control Strategy of Active Power Filters Using Multiple Voltage-Source PWM Converters", IEEE Transaction on Industry Applications, vol. 1A-22, No. 3, May/Jun. 1986, pp. 460-465.
Akagi et al., "Instantaneous Reactive Power Compensators Comprising Switching Devices without Energy Storage Components", IEEE Transactions on Industry Applications, IA-20, (1984), May-Jun., No. 3, Part 1, pp. 625-630.
Cox et al., "A New Static VAR Compensator for an Arc Furnace", IEEE Transactions on Power Systems, PWRS-1, (1986), Aug., No. 3, pp. 110-120.
Mitsubishi Electric Corp. Technical Report, "Static Reactive Power Compensation System", Dec. 1984, pp. 38-41.

Primary Examiner—Patrick R. Salce
Assistant Examiner—Kristine Peckman
Attorney, Agent, or Firm—Bernard, Rothwell & Brown

[57] ABSTRACT

The reactive power compensation system used for preventing the power voltage fluctuation includes an inverter which operates in response to a high-frequency PWM signal based on the reactive power determined from the voltage and current at the receiving point to compensate a sharp varying component of reactive power created by the load, and a capacitor which is connected or disconnected with the power system through a semiconductor switch on the basis of comparison of the load reactive power with preset values so as to supply the leading reactive power back to the power system.

1 Claim, 4 Drawing Sheets

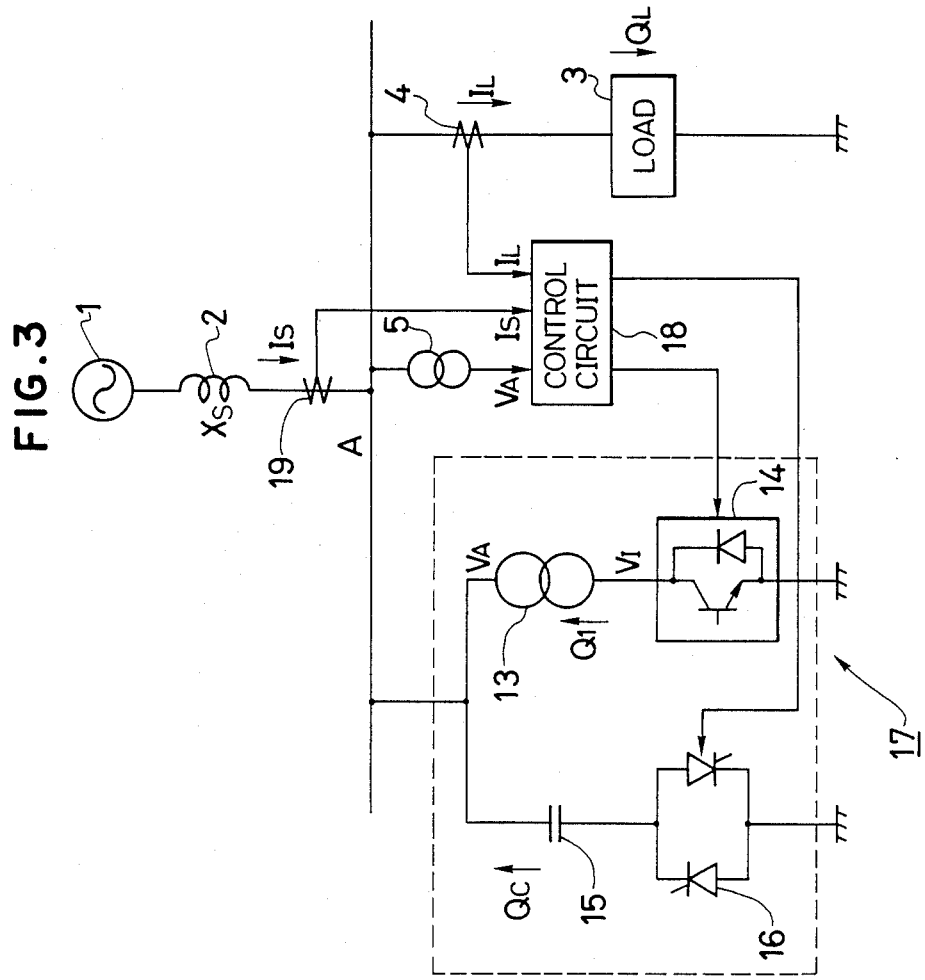

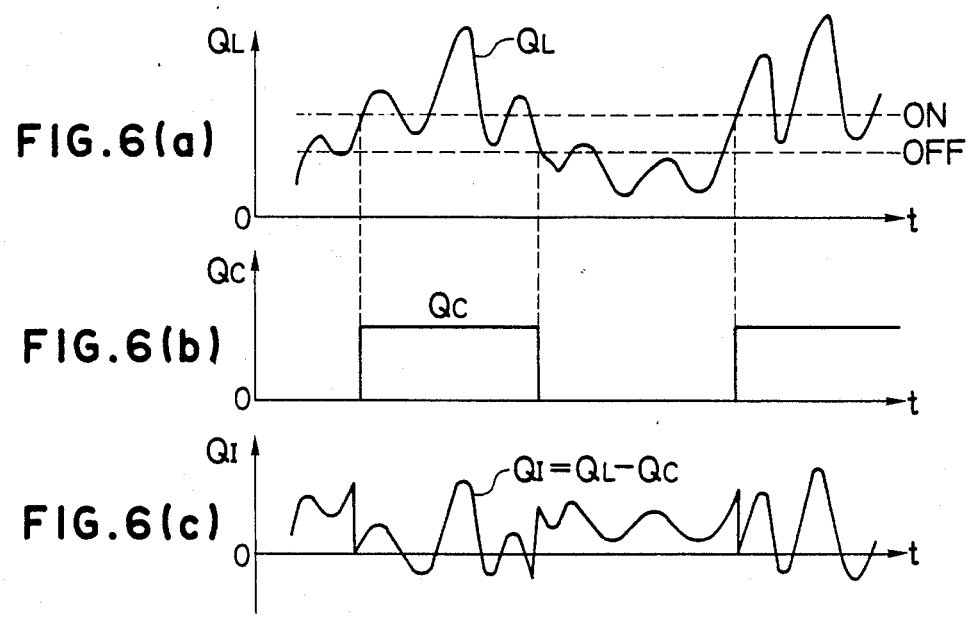
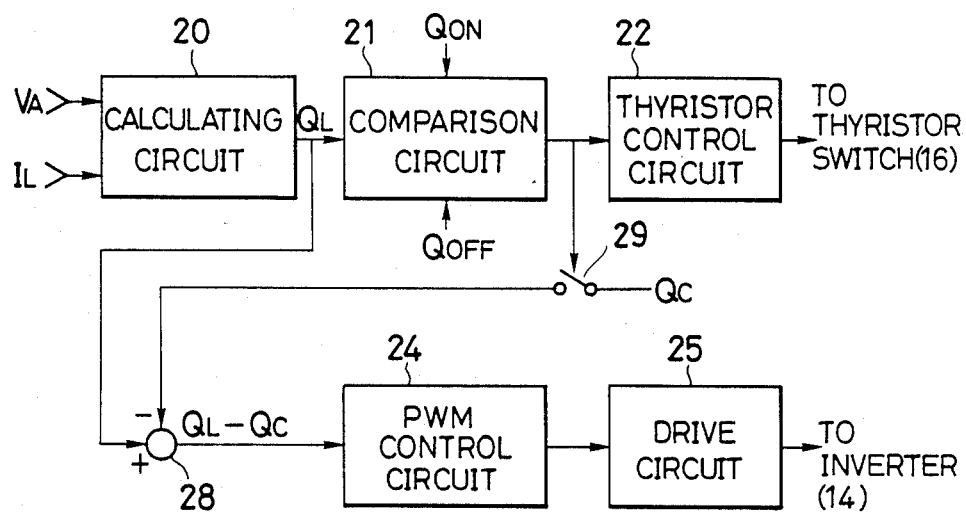

REACTIVE POWER COMPENSATION SYSTEM

BACKGROUND OF THE INVENTION

1. Field of the Invention

The present invention relates to a reactive power compensation system and, particularly, to a reactive power compensation system used for preventing the fluctuation of power voltage caused by the variation of load current, which is mainly the reactive power, attributable to the irregular variation in the length of arc in a steel producing arc furnace.

2. Description of the Prior Art

FIG. 1 is a schematic diagram showing the conventional reactive power compensation system disclosed in article "Static Reactive Power Compensation System" in Mitsubishi Electric Corp. Technical Report, published in December 1984. In the figure, indicated by 1 is an a.c. power source, 2 is power source impedance, 3 is a variable load such as a steel producing arc furnace, 4 is a current transformer for detecting the load current, 5 is a voltage transformer for detecting the power voltage, 6 is a capacitor, 7 is a reactor, 8 is a thyristor switch for controlling the lagging reactive current flowing through the reactor 7, 9 is a reactive power compensating circuit constituted by the capacitor 6, reactor 7 and thyristor switch 8, and 10 is a control circuit for the reactive power compensating circuit 9.

FIG. 2 shows in detail the control circuit 10 in FIG. 1, where indicated by 11 is a reactive power calculating circuit, and 12 is a thyristor firing angle control circuit which determines the firing phase angle of the thyristor switch 8 in accordance with the calculated value of reactive power.

The operation of the above system arrangement is as follows: When the variable load 3 such as a steel producing arc furnace is connected to the power system of the a.c. power source 1, reactive power $Q_L$ attributable to the load 3 creates a voltage variation $\Delta V$ at the power receiving point A as evaluated by the following equation.

$$\Delta V = X_S \cdot Q_L \quad (1)$$

where $X_S$ represents the value of power impedance 2 shown in FIG. 1.

In order to suppress the voltage variation $\Delta V$, the reactive power compensating circuit 9 made up of the capacitor 6, reactor 7 and thyristor switch 8 is employed. The reactive power compensating circuit 9 supplies compensating reactive power $Q_C$ back to the power system in proportion to the reactive power $Q_L$ flowing through the load 3 by determination of the thyristor firing angle by the thyristor firing angle control circuit 12 in the control circuit 10 on the basis of the reactive power signal calculated by the reactive power calculating circuit 11 in response to the voltage and current values detected by the current transformer 4 and voltage transformer 5. As a result of this reactive power feedback, the voltage variation at the receiving point A becomes:

$$\Delta V = X_S(Q_L - Q_C) \quad (2)$$

Accordingly, by making $Q_C$ substantially equal to $Q_L$, the voltage variation $\Delta V$ is diminished.

In the conventional reactive power compensation system, arranged as described above, the thyristor switch 8 controls the reactive power once a half power cycle at most. This results in a control retardation of a half power cycle at maximum, and the reactive power compensating circuit 9 is not sufficiently responsive to a fast varying reactive power. In consequence, when the load current includes harmonic components as in the case of a steel producing arc furnace, the voltage fluctuation can barely be reduced to about ⅓ at most, and a further reduction is left unsolved.

SUMMARY OF THE INVENTION

The present invention is intended to overcome the foregoing prior art deficiency, and its prime object is to provide an reactive power compensation system capable of sufficiently diminishing the power voltage fluctuation against a fast varying reactive power caused by a load such as a steel producing arc furnace.

The inventive reactive power compensation system incorporates a reactive power compensating circuit which compensates the variation of reactive power created by the load by feeding compensating reactive power back to the power system of the load. The reactive power compensating circuit operates on a fast, pulse-width controlled inverter to compensate a sharp varying component of the reactive power and on a capacitor, which is connected by a switch to the power system, to compensate an average-level component of the reactive power.

Other objects and advantages of the present invention will become more apparent from the following detailed description of the specific embodiments taken in conjunction with the accompanying drawings.

BRIEF DESCRIPTION OF THE DRAWINGS

FIG. 3 is a schematic diagram showing the reactive power compensation system embodying the present invention;

FIGS. 6(a)-(c) is a waveform diagram showing reactive power values at various portions of the control circuit of FIG. 5; and FIG. 7 is a schematic diagram showing another embodiment of the control circuit according to the present invention.

DETAILED DESCRIPTION OF THE PREFERRED EMBODIMENTS

Figure 1:
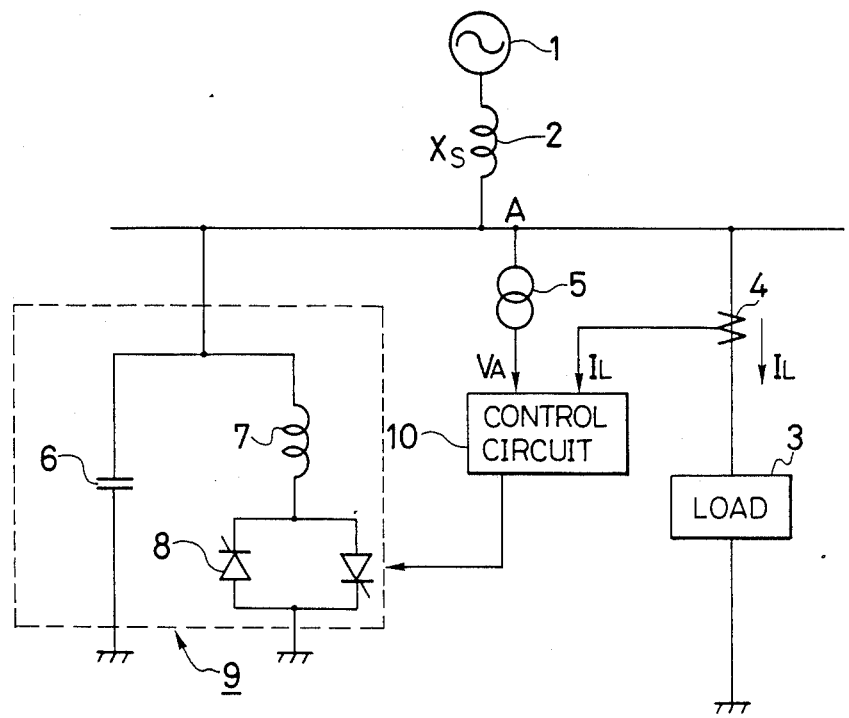
FIG. 1 is a schematic diagram showing the conventional reactive power compensation system.
Figure 2:
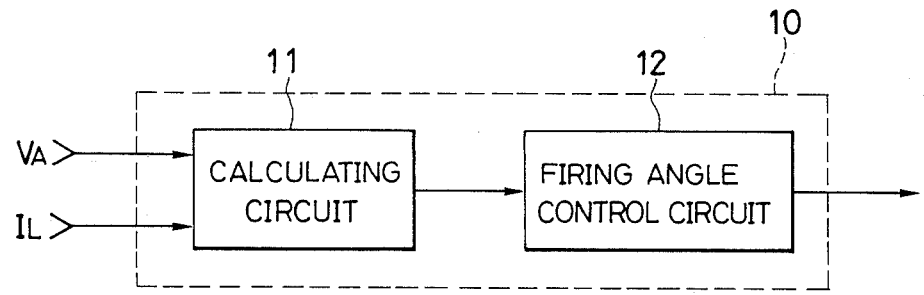
FIG. 2 is a schematic diagram of the control circuit shown in FIG. 1.

An embodiment of this invention will now be described with reference to the drawings. In FIG. 3, indicated by numeral 13 is an inverter transformer, 14 is a voltage-type inverter configured by switching devices having a self turn-off ability, 15 is a capacitor for feeding the leading reactive power back to the power system, 16 are thyristors for connecting or disconnecting the capacitor 15 to the power system, 17 is a reactive power compensating circuit constituted by the inverter transformer 13, voltage-type inverter 14, capacitor 15 and thyristors 16, 18 is a control circuit for the reactive power compensating circuit 17, and 19 is a current transformer for detecting the supply current $I_S$ from the power source 1. Other system components identical to those shown in FIG. 1 are given the common reference numerals and their explanation is not repeated here.

Next, the operation of the above system arrangement will be described, starting with the reactive power compensating circuit 17 which is a part of the inventive system.

Figure 4:
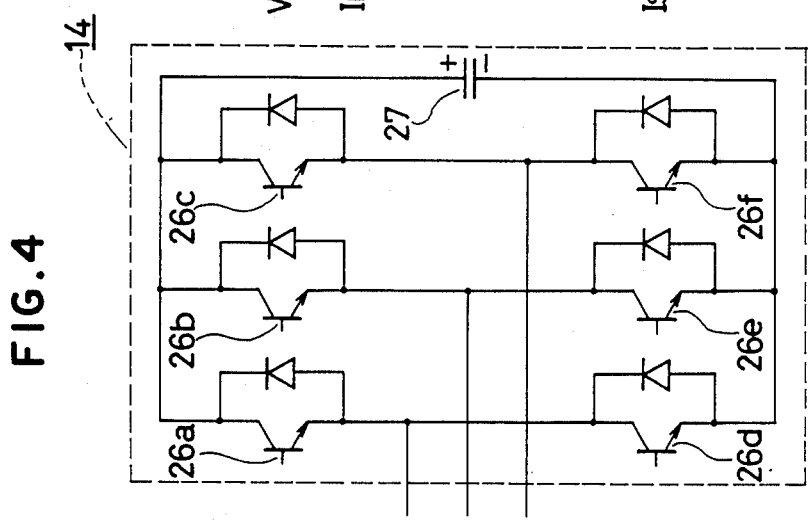
FIG. 4 is a detailed schematic diagram of the inverter circuit embodying the present invention.

The inverter 14 includes six transistors 26a–26f in 3-phase bridge configuration as shown in FIG. 4, as example, and it shapes the d.c. voltage across a d.c. polarized capacitor 27 to produce an inverter voltage $V_I$. The inverter 14 is connected to the power system through the inverter transformer 13 so that it provides reactive power $Q_I$ in proportion to the difference between the receiving voltage $V_A$ at the power receiving point A and the inverter voltage $V_I$. The reactive power $Q_I$ is expressed by the following equation.

$$Q_I = V_A \cdot \frac{(V_I - V_A)}{X_{TR}} \quad (3)$$

where $X_{TR}$ represents the impedance of the inverter transformer 13.

On the basis of equation (3), the reactive power $Q_I$ is positive when $V_I > V_A$ in which case the inverter 14 supplies reactive power to the power system (i.e., leading operation), or the reactive power $Q_I$ is negative when $V_I < V_A$ in which case the inverter 14 absorbs the reactive power from the power system (i.e., lagging operation). Accordingly, a single unit of inverter 14 implements both of the lead-phase operation and lag-phase operation. The inverter 14 can be rendered pulse-width modulation (PWM) at a high frequency above 1 kHz, for example, thereby having a response time of 1 ms or less, which is almost 1/10 achieved by the conventional reactive power compensating circuit.

However, the foregoing reactive power compensating circuit 17 has the drawbacks of a greater switching loss and higher construction cost, and therefore a greater operating loss and higher system cost will result when it is intended to compensate the entire range of reactive power flowing through the load 3. On this account, the inventive reactive power compensating circuit 17 has its inverter 14 connected in parallel with a serial connection of a capacitor 15 and a thyristor switch 16, so that a large varying component of reactive power created by the load is compensated by the inverter, while an average reactive power component is compensated by the capacitor 15.

Figure 5:
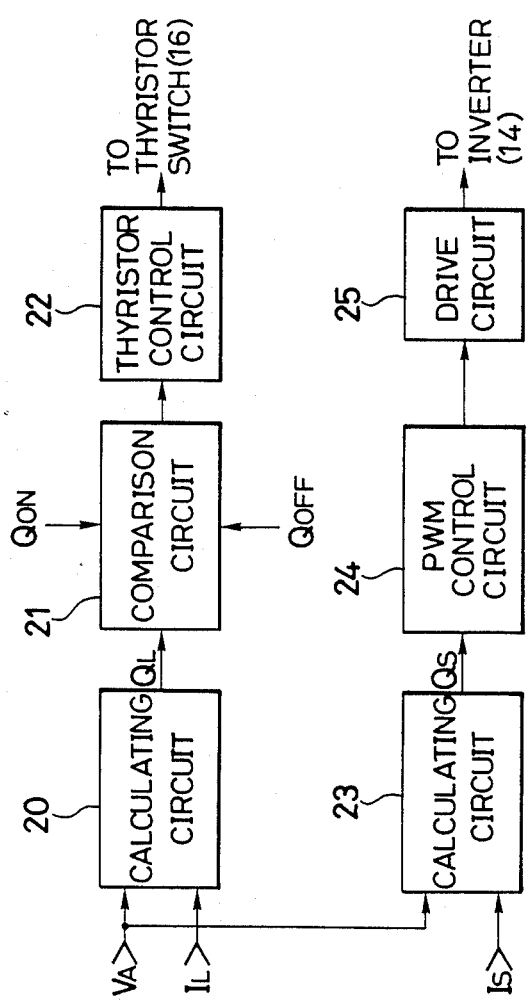
FIG. 5 is a schematic diagram of the control circuit embodying the present invention.

FIG. 5 shows in detail the arrangement of the control circuit 18. In the figure, a reactive power calculating circuit 20 calculates the reactive power $Q_L$ flowing into the load 3 from the terminal voltage $V_A$ at the power receiving point A and the load current $I_L$, and delivers the result $Q_L$ to a comparison circuit 21 located in the next stage. The comparison circuit 21 compares the reactive power $Q_L$ with preset power levels $Q_{ON}$ and $Q_{OFF}$, and provides a capacitor connection command to a thyristor control circuit 22. The capacitor connection command is to connect the capacitor 15 to the power system when $Q_L > Q_{ON}$, or to disconnect the capacitor 15 when $Q_L < Q_{OFF}$. The thyristor control circuit 22 produces a thyristor firing signal to the thyristors 16 depending on the state of the received command signal.

The supply current $I_S$ from the power source is detected by the current transformer 19, and it is used along with the power voltage $V_A$ detected by the voltage transformer 5 by the reactive power calculating circuit 23, which then calculates the reactive power $Q_S$ flowing through the power source. The reactive power is detected as $Q_L - Q_C$ after the compensation by the capacitor 15, where $Q_C$ is the leading imaginary power on the capacitor 15. Accordingly, the reactive power $Q_S$ is smaller in magnitude than the reactive power $Q_L$ by the leading reactive power component $Q_C$, allowing the provision of a smaller compensating capacitance through the control of the reactive power compensating circuit 17 using the reactive power $Q_S$. For this implementation, the arrangement of FIG. 5 delivers the detected reactive power $Q_S$ of the power system to an inverter pulse-width modulation (PWM) control circuit 24 so as to produce a PWM signal necessary for the inverter 14 to supply the reactive power $Q_S$ back to the power system.

The inverter PWM control circuit 24 can be a system of comparison with a triangular carrier waveform, as employed commonly, although it is not shown here.

The inverter PWM control circuit 24 has its output delivered to a transistor drive circuit 25, which provides drive signals in compliance with the received PWM signal to the respective transistors 26a–26f. Through this control, it becomes possible to compensate a sharp variation of reactive power in the load by means of the inverter 14 in the reactive power compensating circuit 17 and a gradual average variation of reactive power by means of the capacitor 15 which is connected or disconnected to the power system by the thyristor switch 16.

FIGS. 6(a)–(c) explains the above operation on the waveform of various reactive power components. Shown by 6(a) is the reactive power $Q_L$ flowing into the load 3, 6(b) is the reactive power $Q_C$ discharged by the capacitor 15 which is connected or disconnected to the power system by the thyristor switch 16, and 6(c) is the reactive power $Q_I$ compensated by the inverter 14. As will be appreciated from the waveform 6(c), the reactive power compensating circuit 17 can have a smaller compensating capacity as compared with the reactive power $Q_L$ on the load, allowing the use of a responsive and yet economical inverter, whereby its feature of controlling both the leading and lagging reactive power can fully be exerted.

FIG. 7 shows another embodiment of the control circuit 18, in which the reactive power $Q_C$ on the capacitor 15 is sampled through an electronic switch 29 into the calculating circuit 28 so that it is subtracted from the load reactive power $Q_L$. The electronic switch 29 is operated to open or close in response to the capacitor connect/disconnect command provided by the comparison circuit 21.

Although in the foregoing embodiment the inverter 14 is a voltage-type inverter, it may be a current-type inverter.

Although in the foregoing embodiment the inverter 14 is configured by transistors, these switching devices may be other semiconductor devices having a self turn-off ability, such as gate turn-off thyristors, and the same effectiveness as the above embodiment will be accomplished.

Although in the foregoing embodiment the capacitor 15 is connected or disconnected with the power system through the thyristors 16, they may be replaced with mechanical switches, and the same effectiveness as the above embodiment will be accomplished.

According to the present invention, as described above, the variation of reactive power created by the load is compensated by feeding the reactive power back to the power system of the load through the provision of the reactive power compensating circuit, in which the fast, pulse-width controlled inverter compensates a sharp variation of the load reactive power and a capacitor which is connected or disconnected with the power system by a switch compensates an average level component of the load reactive power, whereby the voltage fluctuation of the power system in connection with a sharp, drastically varying load such as a steel producing arc furnace can sufficiently be suppressed and yet the system can be constructed using an inexpensive, less capacious inverter.

What is claimed is:

1. A reactive power compensation system operating to compensate a variation of reactive power created by a load in connection with a power system in such a manner of feeding a compensating reactive power produced on the basis of the load reactive power by a reactive power compensating circuit back to said power system, said reactive power compensating circuit comprising an inverter which compensates a sharp varying component of the load reactive power by being controlled in a fast, pulse-width modulation mode by a control circuit, and a capacitor which compensates an average-level component of the load reactive power by being connected to said power system through a switch wherein said control circuit comprises a reactive power calculating circuit which calculates the value of reactive power flowing into said load, a comparison circuit which compares the value of reactive power calculated by said calculating circuit with preset power levels, a switch control circuit which controls said switch in response to a command from said comparison circuit, a subtraction circuit which receives the value of reactive power dealt with by said capacitor through an electronic switch to subtract the reactive power value of said capacitor from the reactive power value of said load, a pulse-width modulation (PWM) control circuit which receives the output of said subtraction circuit to produce a PWM signal, and a switch drive circuit which controls said inverter in response to the output signal of said PWM control circuit.

* * * * *

UNITED STATES PATENT AND TRADEMARK OFFICE
CERTIFICATE OF CORRECTION

PATENT NO. : 4,857,821

DATED : August 15, 1989

INVENTOR(S) : MASATOSHI TAKEDA

It is certified that error appears in the above-identified patent and that said Letters Patent is hereby corrected as shown below:

Col. 4, line 5, "$O_S$" should be --$Q_S$--.

Signed and Sealed this

Eleventh Day of September, 1990

Attest:

HARRY F. MANBECK, JR.

*Attesting Officer*   *Commissioner of Patents and Trademarks*